US010642341B2

(12) United States Patent
Srinivasan

(10) Patent No.: US 10,642,341 B2
(45) Date of Patent: May 5, 2020

(54) SELECTIVE MODIFICATION OF POWER STATES BASED ON CONDITIONS

(71) Applicant: Juniper Networks, Inc., Sunnyvale, CA (US)

(72) Inventor: Eswaran Srinivasan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 151 days.

(21) Appl. No.: 15/934,684

(22) Filed: Mar. 23, 2018

(65) Prior Publication Data

US 2019/0294233 A1    Sep. 26, 2019

(51) Int. Cl.
*G06F 1/32* (2019.01)
*G06F 1/3296* (2019.01)
(Continued)

(52) U.S. Cl.
CPC ............ *G06F 1/3296* (2013.01); *G06F 1/325* (2013.01); *G06F 1/3206* (2013.01); *G06F 1/3287* (2013.01); *H04L 12/10* (2013.01); *H04L 41/0654* (2013.01); *H04L 41/12* (2013.01); *H04L 49/555* (2013.01); *G06N 20/00* (2019.01); *H04L 41/147* (2013.01); *H04L 41/16* (2013.01);
(Continued)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 5,450,616 A * 9/1995 Rom ..................... H04W 52/60
455/69
6,170,028 B1    1/2001 Wallach et al.
(Continued)

FOREIGN PATENT DOCUMENTS

CN    1327608 C    7/2007

OTHER PUBLICATIONS

Extended European Search Report for Application No. EP19163267.8, dated Aug. 1, 2019, 8 pages.
(Continued)

*Primary Examiner* — Zahid Choudhury
(74) *Attorney, Agent, or Firm* — Harrity & Harrity, LLP

(57) ABSTRACT

A network device may identify a configuration of resources that are to support attachable line cards. The configuration may include a power supply configuration that is used to provide power to packet processing components that are supported by the line cards, and a resource distribution configuration indicating whether resources in the line cards are shared between the packet processing components. The network device may determine whether to modify a power state of a packet processing component based on whether one or more power modification conditions are satisfied. The network device may modify the power state of the packet processing component based on determining that the power modification condition is satisfied. The power state of the packet processing component may be able to be modified to a particular power state based on the configuration of resources.

20 Claims, 6 Drawing Sheets

(51) Int. Cl.
  *G06F 1/3206* (2019.01)
  *H04L 12/24* (2006.01)
  *H04L 12/939* (2013.01)
  *H04L 12/10* (2006.01)
  *G06F 1/3234* (2019.01)
  *G06F 1/3287* (2019.01)
  *G06N 20/00* (2019.01)
  *H04L 12/26* (2006.01)
  *H04L 12/931* (2013.01)
  *H04L 12/935* (2013.01)

(52) U.S. Cl.
  CPC .......... *H04L 43/0817* (2013.01); *H04L 49/30* (2013.01); *H04L 49/405* (2013.01)

(56) References Cited

U.S. PATENT DOCUMENTS

| | | | |
|---|---|---|---|
| 6,816,936 | B1 | 11/2004 | Wu et al. |
| 7,966,491 | B2* | 6/2011 | Nassor .................... H04L 63/08 380/255 |
| 8,345,675 | B1 | 1/2013 | Raghunath |
| 8,611,540 | B2* | 12/2013 | Chaturvedi ........... H04L 63/061 380/273 |
| 10,133,341 | B2* | 11/2018 | Brown .................. G06F 1/3203 |
| 2012/0054511 | A1* | 3/2012 | Brinks ...................... G06F 1/26 713/310 |
| 2013/0073878 | A1* | 3/2013 | Jayasimha ............ G06F 1/3287 713/300 |
| 2014/0126577 | A1* | 5/2014 | Post ...................... G06F 9/5027 370/400 |
| 2014/0365787 | A1 | 12/2014 | Sagar et al. |
| 2016/0378160 | A1* | 12/2016 | Muralidhar ........... G06F 1/3203 713/323 |
| 2017/0150242 | A1* | 5/2017 | Koren ................. H04L 47/6255 |
| 2018/0074570 | A1 | 3/2018 | Akella et al. |
| 2019/0294233 | A1* | 9/2019 | Srinivasan ............ H04L 49/555 |

OTHER PUBLICATIONS

Mahadevan et al. "A Power Benchmarking Framework for Network Devices", 2009, 14 pages.
Juniper Networks, Inc., "Junos® OS—Chassis-Level Feature Guide", Dec. 2018, 2106 pages.

* cited by examiner

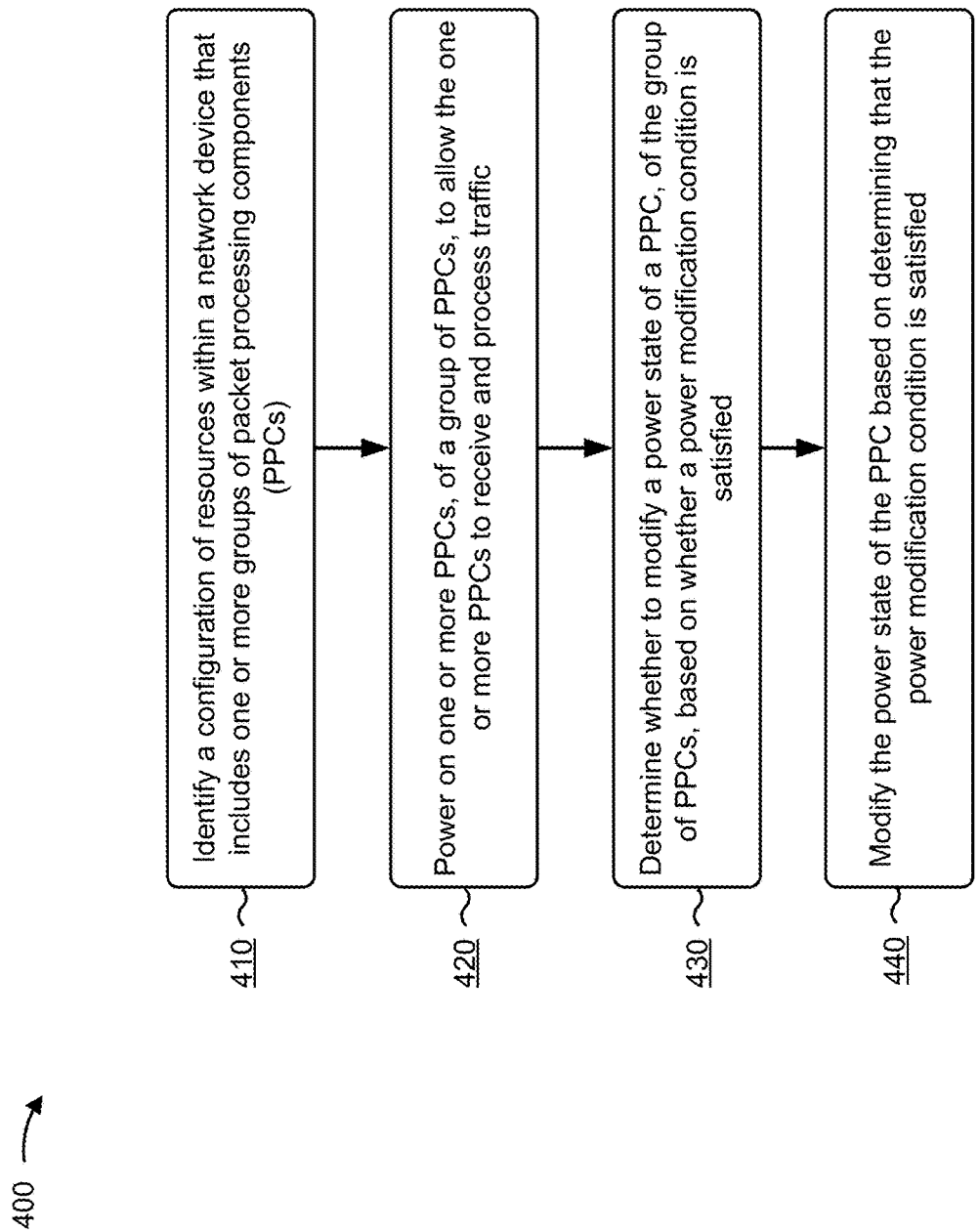

SELECTIVE MODIFICATION OF POWER STATES BASED ON CONDITIONS

BACKGROUND

A network device may include a group of packet processing components for performing packet switching functions, packet routing functions, route lookup functions, and/or the like. The group of packet processing components may be powered on and off using one or more power supply switches.

SUMMARY

According to some possible implementations, a network device may include one or more line cards that support one or more groups of packet processing components and one or more processors. The one or more processors may execute a scanning technique to identify a configuration of resources that are to support the one or more groups of packet processing components. The configuration may include a power supply configuration that is used to provide power to the one or more groups of packet processing components, and a resource distribution configuration indicating whether resources in the one or more line cards are shared between packet processing components included in the one or more groups of packet processing components. The one or more processors may determine whether to modify a power state of a packet processing component, of the one or more groups of packet processing components, based on whether a power modification condition is satisfied. The one or more processors may modify the power state of the packet processing component based on determining that the power modification condition is satisfied. The power state may be capable of being modified to a full power state, a low power state, or a no power state. The power state of the packet processing component may be able to be modified to a particular power state based on the configuration of resources that is to support the one or more groups of packet processing components.

According to some possible implementations, a non-transitory computer-readable medium may store one or more instructions that, when executed by one or more processors, cause the one or more processors to execute a scanning technique to identify a configuration of resources that are to support one or more line cards that are attachable to a device associated with the one or more processors. The configuration may include a power supply configuration that is used to provide power to one or more groups of packet processing components that are supported by the one or more line cards and/or a resource distribution configuration indicating whether resources in the one or more line cards are shared between packet processing components included in the one or more groups of packet processing components. The one or more instructions may cause the one or more processors to determine whether to modify a power state of a packet processing component, of the one or more groups of packet processing components, based on whether a power modification condition is satisfied. The one or more instructions may cause the one or more processors to modify the power state of the packet processing component based on determining that the power modification condition is satisfied. The power state may be capable of being modified from a first power state to: a second power state or to a third power state. The power state of the packet processing component may be able to be modified to the second power state or to the third power state based on the configuration of resources that support the one or more line cards.

According to some possible implementations, a method may include identifying, by a network device, a configuration of resources that are to support one or more line cards that are attachable to the network device. The configuration may include a power supply configuration that is used to provide power to one or more groups of packet processing components that are supported by the one or more line cards, and a resource distribution configuration indicating whether resources in the one or more line cards are shared between packet processing components included in the one or more groups of packet processing components. The method may include determining, by the network device, whether to modify a power state of a packet processing component, of the one or more groups of packet processing components, based on whether one or more power modification conditions are satisfied. The method may include modifying, by the network device, the power state of the packet processing component based on determining that the power modification condition is satisfied. The power state of the packet processing component may be able to be modified to a particular power state based on the configuration of resources supporting the one or more groups of packet processing components.

BRIEF DESCRIPTION OF THE DRAWINGS

FIG. 4 is a flow chart of an example process for modifying a power state of a packet processing component, of a group of packet processing components, based on whether a power modification condition is satisfied.

DETAILED DESCRIPTION

Figure 1A:
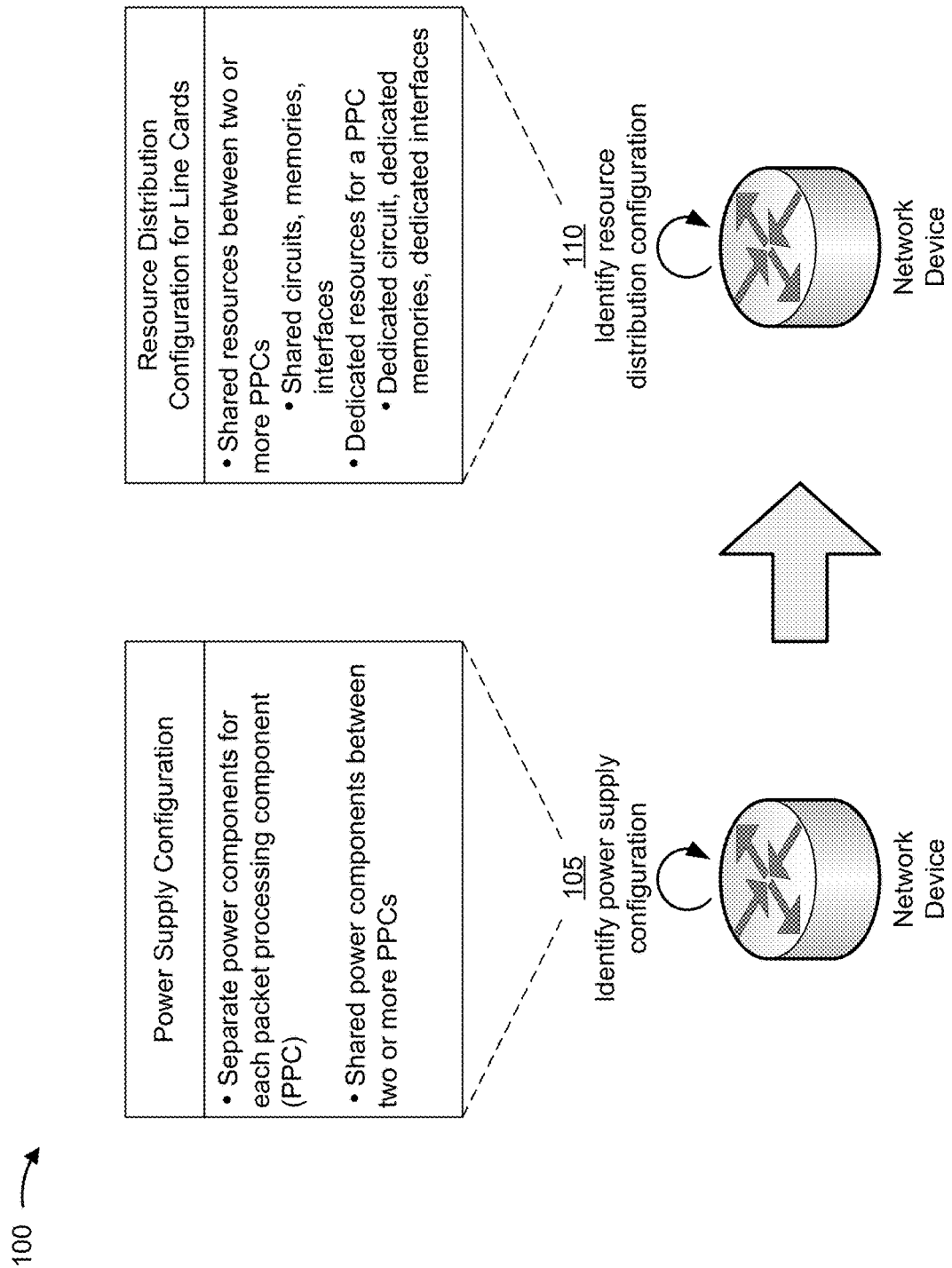
FIG. 1A-1C are diagrams of an overview of an example implementation described herein.

The following detailed description of example implementations refers to the accompanying drawings. The same reference numbers in different drawings may identify the same or similar elements.

A network device may support a set of line cards that include packet processing components for performing packet switching functions, packet routing functions, route lookup functions, and/or the like. Additionally, organizations that sell network devices often focus on developing new features and functionality for line cards. This allows existing customers to simply replace older line cards with newer line cards, without having the replace the entire network device.

Historically, each line card would be manufactured and configured to support one packet processing component. This would allow the packet processing component to use a dedicated power supply, thereby allowing the packet processing component to be turned on and off without issue.

However, as demand for data services increased, line cards were manufactured to support multiple packet processing components. As described below, line cards have been manufactured that include a variety of different resource configurations, and are supported by network devices with a variety of different power supply configurations.

For example, a network device may be configured with a first line card that has separate resources reserved for each packet processing component. In this case, each packet processing component may be supported using separate integrated circuits, may utilize separate memories, may have separate connections to a switching fabric of the network device, and/or the like.

Additionally, or alternatively, the same network device may be configured with a second line card that has shared resources between multiple packet processing components. In this case, two or more packet processing components may be supported using the same integrated circuit, may utilize the same memories, may share a connection to the switching fabric of the network device, and/or the like. Furthermore, the network device may support line cards using power supply configurations that share power supplies between packet processing components, that have dedicated power supplies for each packet processing component, and/or that have a combination whereby some packet processing components have a dedicated power supply and other packet processing components share power supplies.

However, a particular power supply configuration of the network device and/or a particular resource distribution configuration of a line card may prevent particular packet processing components from being powered on or powered off individually. For example, if the network device supports a line card that has shared resources between multiple packet processing components, and the multiple packet processing components share a power supply, the network device may be prevented from powering on and/or powering off a particular packet processing component (without powering on and/or powering off all of the packet processing components).

Additionally, the network device may not be able to leave all packet processing components in a powered on state. For example, a client may purchase a line card with four or more packet processing components, and may engage in a pay-as-you-go payment plan to reduce costs. In this case, the client may be able to activate one or more of the packet processing components, and may be charged for only the packet processing components that have been activated. Furthermore, circuit board temperatures may rise to a degree where one or more packet processing components need to be turned off to avoid overheating, a hardware component of a packet processing component may malfunction, a switching fabric of the network device may have insufficient per-slot bandwidth to effectively route traffic coming to and/or from the packet processing components, and/or the like.

Some implementations described herein provide a method for powering on and/or powering off particular packet processing components of a network device, regardless of a power supply configuration of the network device or a resource distribution configuration of line cards within the network device. For example, assume the network device includes a group of packet processing components and one or more power components (e.g., a power supply, a power supply switch, etc.). In this case, the network device may execute a scanning technique to identify an internal configuration of resources. For example, the network device may execute the scanning technique to identify a power supply configuration within the network device and a resource distribution configuration for one or more line cards that are plugged into the network device.

Additionally, the network device may power on one or more packet processing components of a group of packet processing components that are supported by one or more line cards. In this case, the one or more packet processing components may begin processing traffic associated with one or more clients.

Additionally, the network device my determine whether to modify a power state of a particular packet processing component, of the group of packet processing components, based on whether a power modification condition is satisfied. For example, the network device may be configured with a set of power modification conditions, and may determine to modify a power state of a particular packet processing component if the set of power modification conditions is satisfied.

A power state may be a full power state, a low power state, or a no power state. In some implementations, there may be fewer or additional power states. The power modification condition may be satisfied if the network device receives instructions (e.g., from a server device) to modify the power state, if a capacity level of a packet processing component satisfies a threshold capacity level, if an error (e.g., a hardware error, a software error, etc.) associated with the packet processing component is detected, if an output from a machine learning model predicts a negative consequence that may require modifying the power state, and/or the like.

Additionally, the network device may modify the power state based on determining that the power modification condition is satisfied. In this case, the network device may modify the power state from a current state to the full power state, the low power state, or the no power state. Furthermore, if the current state is the full power state, the network device may selectively modify the power state to the low power state or to the no power state, based on the identified configuration of resources (e.g., the power supply configuration, the resource distribution configuration, etc.).

In this way, the network device is able to modify the power state of the packet processing component regardless of the power supply configuration of the network device or the resource distribution configuration of the line cards within the network device. Furthermore, by selectively powering on particular packet processing components, and by keeping certain packet processing components in the low power state, the network device conserves power resources relative to a standard network device that has to power on all packet processing components and/or that is unable to utilize the low power state.

Additionally, by allowing the network device to power off particular packet processing components, without having to power off other packet processing components (e.g., that share resources with the particular packet processing component), the network device conserves processing resources that might otherwise be used to retransmit traffic lost while powering off all packet processing components, conserves processing resources that might otherwise be used to execute error correction techniques after traffic is lost, and/or the like. Moreover, by allowing the network device to keep particular packet processing components in the no power state or in the low power state, the network device reduces overall power consumption of the network device, reduces expenses of clients of the network device (e.g., if the client is on a pay-as-you-go plan, as described further herein, etc.), and/or the like.

Figure 1B:
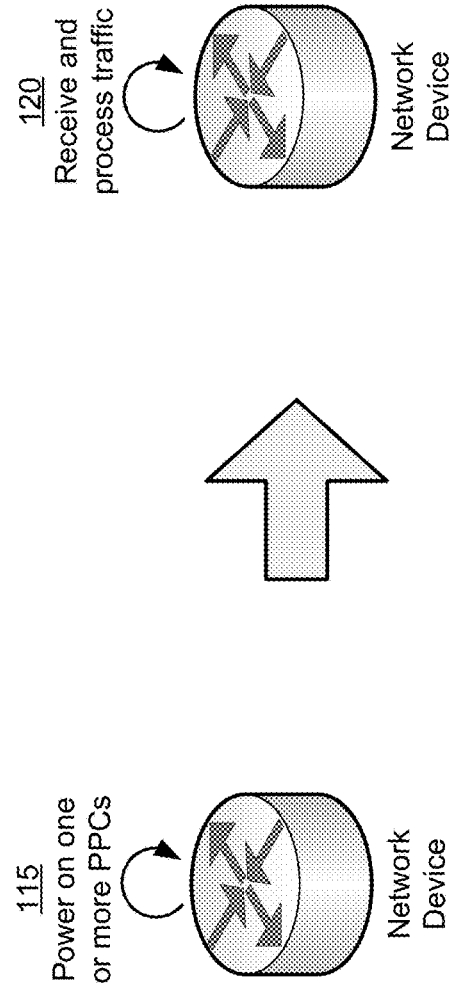
Figure 1C:
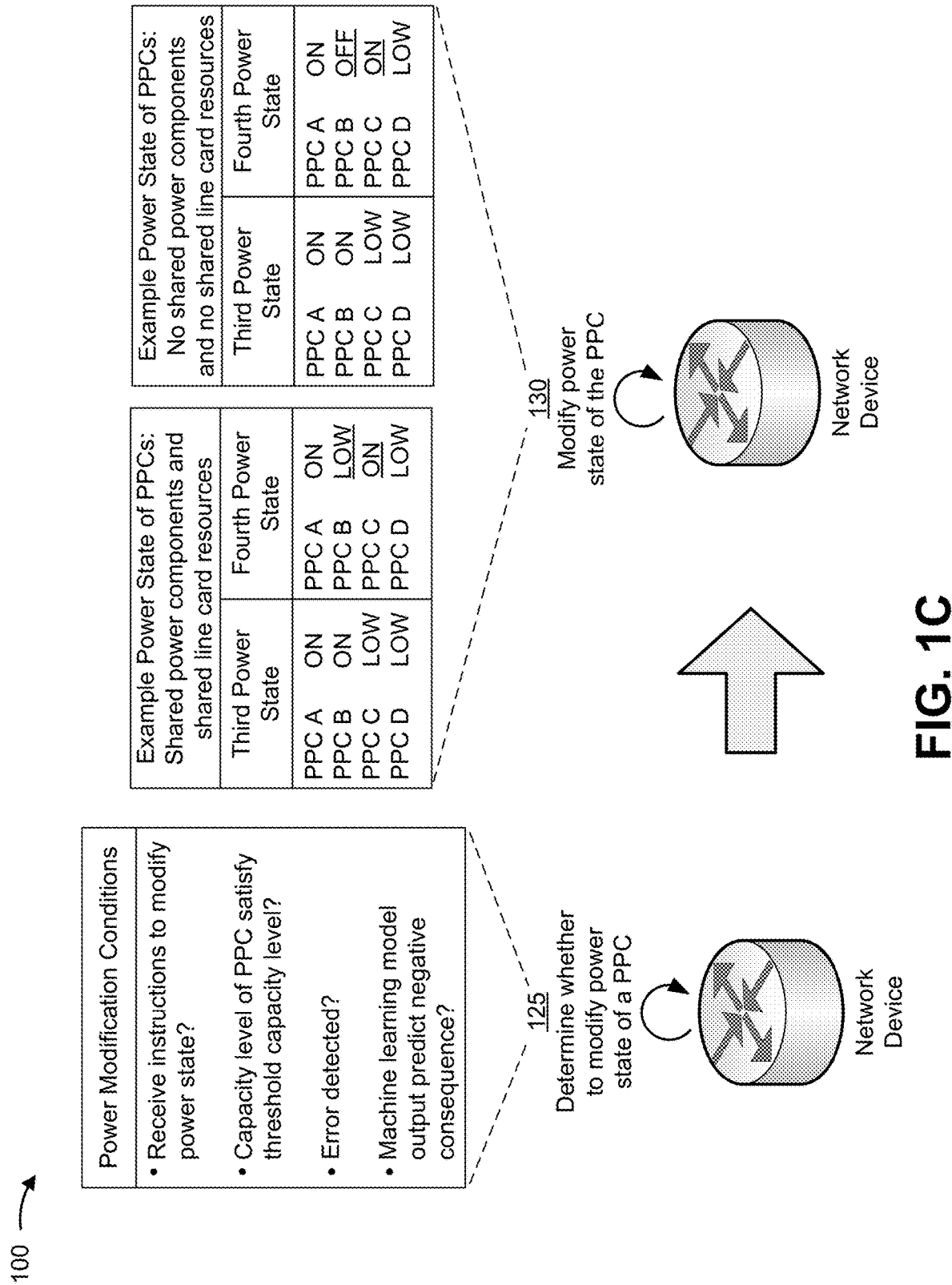

FIGS. 1A-1C are diagrams of an overview of an example implementation 100 described herein. As shown in FIGS. 1A-1C, example implementation 100 shows a process for powering on one or more packet processing components, receiving traffic through the one or more packet processing components, and selectively modifying a power state of the one or more packet processing components based on a configuration of resources included in the network device.

As shown in FIG. 1A, and by reference number 105, the network device may identify a power supply configuration that is used to provide power to one or more groups of packet processing components within the network device. The power supply configuration may indicate a number of power components (e.g., a power supply, a power supply switch, etc.) that are used to support the one or more groups of packet processing components, whether a power component is dedicated to a particular packet processing component or shared between multiple packet processing components, and/or the like.

In some cases, the network device may execute a scanning technique to identify the power supply configuration. For example, the network device may execute a scanning technique that is able to identify a number of power components that are used to support the one or more groups of packet processing components, and may execute the scanning technique to identify whether the one or more groups of packet processing components have dedicated power components, shared power components, a combination of dedicated power components and shared power components, and/or the like.

As shown by reference number 110, the network device may identify a resource distribution configuration for one or more line cards within the network device. For example, the network device may execute a scanning technique to identify the resource distribution configuration for one or more line cards. The resource distribution configuration may, for a line card, indicate a number of packet processing components included in the line card, whether resources available to the line card (e.g., resources from integrated circuits, memories, interfaces, etc.) are dedicated to a particular packet processing component, shared between two or more packet processing components, are both dedicated to a particular packet processing component and shared between two or more packet processing components (e.g., such as in cases with three or more packet processing components), and/or the like.

In some cases, one or more scanning techniques described above may be performed by scanning actual hardware equipment plugged into a chassis of the network device, as described further herein. In other cases, one or more scanning techniques described above may be performed by scanning a data structure that stores data identifying the power supply configuration and/or the resource distribution configuration, as described further herein.

In this way, the network device is able to identify the power supply configuration of the network device and the resource distribution configuration for one or more line cards supported by the network device.

As shown in FIG. 1B, and by reference number 115, the network device may power on one or more packet processing components. For example, for a client to begin utilizing packet processing components of a line card, the network device may need to power the packet processing components on (e.g., by modifying a power state of the packet processing components from a no power state to a full power state).

In some implementations, the network device may power on a particular packet processing component, of the group of packet processing components, using a single power supply and power supply switch. For example, if the particular packet processing component has dedicated power components, the network device may be able to power on the particular packet processing component without affecting other packet processing components included in the same line cards and/or different line cards that are supported by the network device.

In some implementations, the network device may power on multiple packet processing components using the single power supply and power supply switch. For example, if multiple packet processing components share power components, the network device may power on the multiple packet processing components together. However, if not all of the multiple packet processing components are needed to process traffic, the network device may then be able to modify the power state for some of the multiple packet processing components from the full power state to a low power state.

As shown as an example, assume the network device supports a line card that includes four packet processing components (shown as PPC A, PPC B, PPC C, and PPC D) that share line card resources, and that draw power from a single power supply. In this example, because the four packet processing components share line card resources and/or draw power from a single power supply, the network device may have to power on all four packet processing components (shown by the second power state). However, if only two of the packet processing components are needed to support traffic of the client, the network device may modify the power state of the other two packet processing components from the full power state to a low power state (shown as PPC C and PPC D being switched to a low power state).

As shown by reference number 120, the network device may receive and process traffic. For example, the network device may use the one or more packet processing components to receive and process traffic.

In this way, the network device is able to power on one or more packet processing components to a full power state, without having to leave all packet processing components powered on in the full power state, even if the group of packet processing components share resources.

As shown in FIG. 1C, and by reference number 125, the network device may determine whether to modify a power state of a packet processing component. For example, the network device may determine whether to modify a power state of a packet processing component based on whether a power modification condition is satisfied. The power modification condition may be satisfied if the network device receives instructions (e.g., from another device) to modify the power state, if a capacity level of a packet processing component satisfies a threshold capacity level, if an error (e.g., a hardware error, a software error, etc.) associated with the packet processing component is detected, if an output from a machine learning model predicts a negative consequence that may require modifying the power state, and/or the like.

Continuing with the previous example, assume that the network device monitors the active packet processing components (e.g., PPC A and PPC B), while the active packet processing components are receiving and processing traffic. In this example, the network device may detect an error in one of the packet processing components (e.g., PPC B), thereby causing a power modification condition to be satisfied and causing the network device to determine to modify the power state of the packet processing component with the error (e.g., PPC B). Additional examples relating to other power modification conditions are provided further herein.

As shown by reference number 130, the network device may modify a power state of the packet processing component. For example, the network device may modify a power state of the packet processing component based on determining that the power modification condition is satisfied.

In some implementations, the network device may selectively modify the power state of the packet processing component. For example, the network device may selectively modify the power state of the packet processing component based on the identified configuration of resources (e.g., the power supply configuration, the resource distribution configuration, etc.), as illustrated by the following two examples.

Continuing with the previous example, because the packet processing components share power resources from the same power components and share line card resources, the network device may selectively modify the power state of second packet processing component (shown as PPC B) from the full power state to the low power state. In this example, the network device may select the low power state over the no power state because each packet processing component shares power resources from the same power components, and turning off the packet processing component may cut power to other packet processing components that share the same power resources. As further shown, in some cases, the network device may modify the power state of a third packet processing component (e.g., PPC C), such as by modifying the power state of the third packet processing component from the low power state to the full power state, to allow the other packet processing component to support traffic flow that was previously being supported by the packet processing component that incurred the error (e.g., PPC B).

As provided as an additional example, assume the packet processing components do not share power resources from the same power components and do not share line card resources. In this example, the network device may selectively modify the power state of the second packet processing component (shown as PPC B), such as by modifying the power state from the full power state to the no power state. Here, the network device may select the no power state over the low power state because the packet processing components do not share resources. This means that the second packet processing component may be powered off without any repercussions to other packet processing components supported by the network device.

In this way, the network device is able to intelligently and efficiently modify the power state of the packet processing component, regardless of the power supply configuration of the network device or the resource distribution configuration of the line cards within the network device. Furthermore, by selectively powering on particular packet processing components, and by keeping certain packet processing components in the low power state, the network device conserves power resources relative to a standard network device that has to power on all packet processing components and/or that is unable to utilize the low power state.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100.

Figure 2:
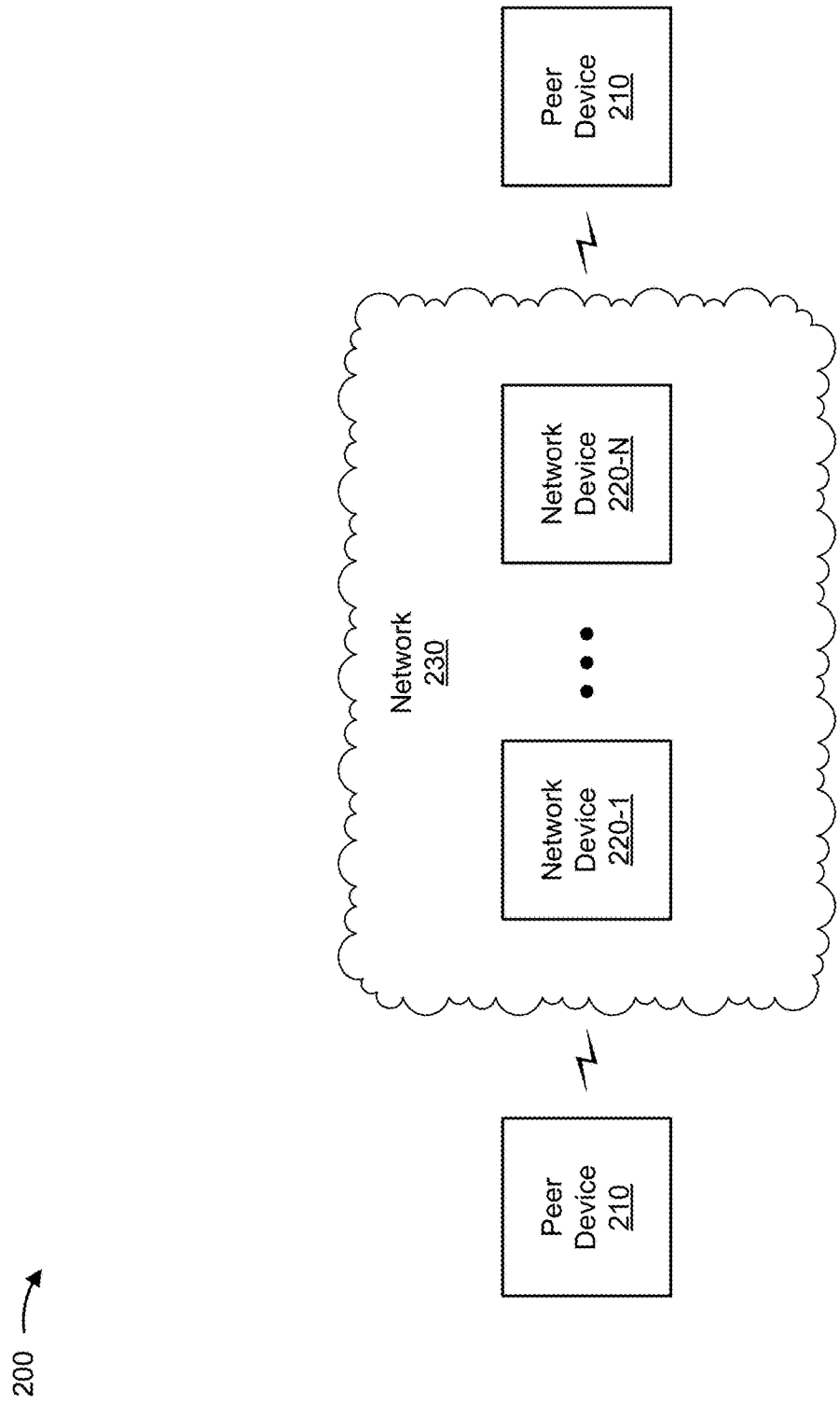
FIG. 2 is a diagram of an example environment in which systems and/or methods, described herein, may be implemented.

As shown in FIG. 2, environment 200 may include one or more peer devices 210, one or more network devices 220-1 through 220-N(N≥1) (hereinafter referred to collectively as "network devices 220", and individually as "network device 220"), and/or a network 230. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a load balancer, or a similar type of device. Additionally, or alternatively, peer device 210 may include an endpoint device that is a source or a destination for network traffic. For example, peer device 210 may include a computer, a server device, a mobile device, or a similar type of device. Peer device 210 may receive network traffic from and/or may provide network traffic to other peer devices 210 via network 230 (e.g., by routing packets using network device(s) 220 as an intermediary).

Network device 220 includes one or more devices capable of receiving, processing, storing, and/or providing traffic and/or configuration information relating to one or more components of network device 220. For example, network device 220 may include a router, such as a label switching router (LSR), a label edge router (LER), an ingress router, an egress router, a provider router (e.g., a provider edge router, a provider core router, etc.), a virtual router, or the like. Additionally, or alternatively, network device 220 may include a gateway, a switch, a firewall, a hub, a bridge, a reverse proxy, a server (e.g., a proxy server, a cloud server, a data center server, etc.), a load balancer, or a similar device. In some implementations, network device 220 may be a physical device implemented within a housing, such as a chassis. In some implementations, network device 220 may be a virtual device implemented by one or more computer devices of a cloud computing environment or a data center. In some implementations, network device 220 may receive traffic from peer device 210 and/or from another network device 220.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment

200 may perform one or more functions described as being performed by another set of devices of environment 200.

Figure 3:
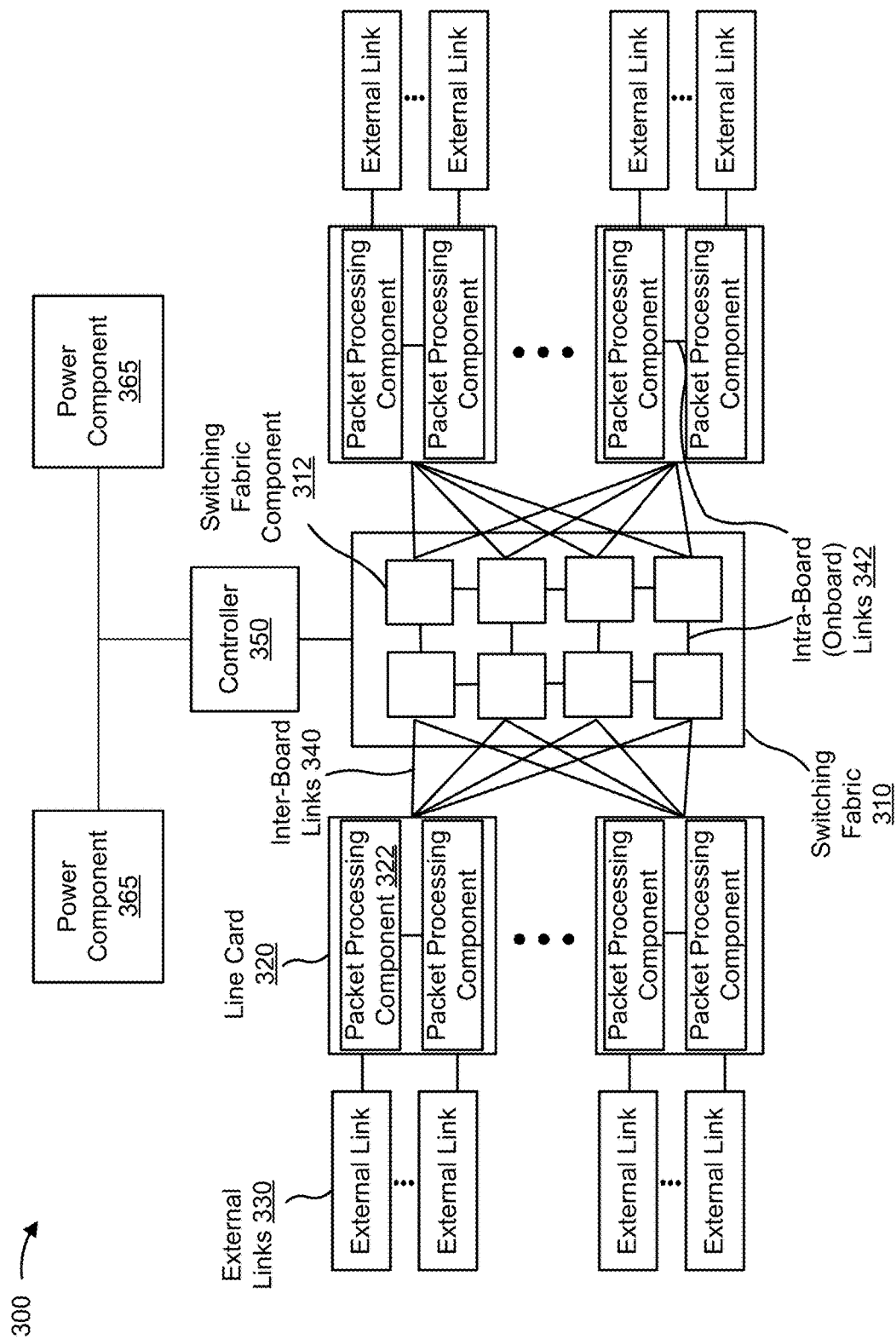
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300.

As shown in FIG. 3, device 300 may include a switching fabric 310, a set of switching fabric components 312, a set of line cards 320 that support a set of packet processing components 322, a set of external links 330, a set of inter-board links 340, a set of intra-board (onboard) links 342, a controller 350, and/or one or more power components 365. In some implementations, traffic between switching fabric 310 and controller 350 may be provided and/or received through a single internal link. In some implementations, traffic between switching fabric 310 and controller 350 may be provided and/or received through a set of inter-board links 340, where each inter-board link 340 may be designated for a subset of external links 330 and/or a subset of line cards 320. In some implementations, line card 320 may use a set of inter-board links 340 to communicate with one or more corresponding planes of a switching fabric 310.

Switching fabric 310 interconnects external links 330 via line cards 320. In some implementations, switching fabric 310 may be implemented using one or more switching fabric components 312 (e.g., one or more crossbars, one or more busses, one or more shared memories, and/or one or more planes). In some implementations, switching fabric components 312 may be connected using intra-board (onboard) links 342. In some implementations, switching fabric 310 may enable external links 330 to communicate. For example, switching fabric 310 may connect with one or more line cards 320 via a set of inter-board links 340, and the one or more line cards 320 may connect with the external links 330, as described further herein.

Line cards 320 include one or more packet processing components 322. For example, line cards 320 may include a modular electronic circuit designed to fit on a printed circuit board (PCB), and may include one or more packet processing components 322. Packet processing component 322 may include one or more processors to process packets, and may process incoming traffic, such as by performing data link layer encapsulation or decapsulation. In some implementations, packet processing component 322 may receive a packet from switching fabric 310, may process the packet, and may output the processed packet to an appropriate external link 330 connected to packet processing component 322. Additionally, or alternatively, packet processing component 322 may receive a packet from external link 330, may process the packet, and may output the processed packet to switching fabric 310 for transfer to controller 350 and/or to another external link 330 (e.g., via the same packet processing component 322 or a different packet processing component 322).

In some implementations, line card 320 may support packet processing component 322 using shared resources. For example, line card 320 may support packet processing component 322 using shared resources such as an integrated circuit, one or more memories, one or more interfaces, and/or the like, wherein the shared resources are accessible to packet processing component 322 and one or more additional packet processing components 322. In some implementations, line card 320 may support packet processing component 322 using dedicated resources (i.e., non-shared resources dedicated to packet processing component 322).

External link 330 is a point of attachment for physical links (e.g., a port) or virtual links (e.g., a virtual local area network (VLAN)), and may be a point of ingress and/or egress for incoming and/or outgoing traffic, such as packets. In some implementations, a single line card 320 may be connected to multiple external links 330. In some implementations, a single line card 320 may be connected to a single external link 330. External link 330 may permit communication between a first network device 220 and a second network device 220 that is a neighbor of the first network device 220. External link 330 may store packets (e.g., in a buffer) and/or may schedule packets for transmission on output physical links. External link 330 may support data link layer encapsulation or decapsulation and/or a variety of higher-level protocols.

Inter-board link 340 is a path that allows line card 320 and/or controller 350 to communicate with switching fabric 310. Inter-board link 340 may include, for example, a wired or wireless path, such as a fiber-optic path, an electrical path, a virtual path, and/or the like. In some implementations, there may be multiple inter-board links 340 between a single packet processing component 322 and switching fabric 310. In some implementations, there may be a single inter-board link 340 between controller 350 and switching fabric 310. Intra-board (onboard) link 342 is a path that allows interconnection between packet processing components 322 and/or switching fabric components 312 (e.g., a physical connection, a virtual connection, etc.).

Controller 350 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 350 may include one or more processors that may be programmed to perform a function. In some implementations, controller 350 may include a group of virtual devices that each includes one or more processors.

In some implementations, controller 350 may include a random access memory (RAM), a read only memory (ROM), and/or another type of dynamic or static storage device (e.g., a flash memory, a magnetic memory, an optical memory, etc.) that stores information and/or instructions for use by controller 350.

In some implementations, controller 350 may communicate with other devices, networks, and/or systems connected to device 300 to exchange information regarding network topology. Controller 350 may create routing tables based on the network topology information, create forwarding tables based on the routing tables, and forward the forwarding tables to packet processing component 322, such as for use in performing route lookups for incoming and/or outgoing packets.

Controller 350 may perform one or more processes described herein. Controller 350 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 350 from another computer-readable medium or from another device via a communication interface. When executed, software instructions stored in a memory and/or storage component associated with controller 350 may cause controller 350 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Power component 365 may include one or more components associated with providing power to network device 220 (e.g., to one or more internal components of network device 220). For example, power component 365 may include a power supply, a power supply switch, interconnects that connect the power supply to the power supply switch, interconnects that connect the power supply and/or the power supply switch to other components described herein, and/or a similar type of component. In some implementations, a single power component 365 may supply power to a single packet processing component 322, to multiple packet processing components 322 in a particular line card 320, to multiple packet processing components 322 that are associated with multiple line cards 320, and/or the like.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for modifying a power state of a packet processing component, of a group of packet processing components, based on whether a power modification condition is satisfied. In some implementations, one or more process blocks of FIG. 4 may be performed by network device 220. In some implementations, one or more process blocks of FIG. 4 may be performed by another device or a group of devices separate from or including network device 220, such as peer device 210 or another network device 220.

As shown in FIG. 4, process 400 may include identifying a configuration of resources within a network device that includes one or more groups of packet processing components (block 410). For example, network device 220 (e.g., controller 350) may identify a configuration of resources within network device 220 by executing a scanning technique to identify a power supply configuration within network device 220, a resource distribution configuration for one or more line cards 320 of network device 220, and/or the like.

The power supply configuration may indicate a number of power components (e.g., a power supply, a power supply switch, etc.) that are used to support the group of packet processing components 322, whether particular power components are dedicated to particular packet processing components 322 or shared between multiple packet processing components 322, and/or the like.

The resource distribution configuration for a line card 320 may indicate a number of packet processing components 322 included in a line card 320, whether resources available to the line card 320 are shared between two or more packet processing components 322 or split such that each packet processing component 322 has individual resources, and/or the like. The resources that may be shared or split between each packet processing component 322 may include resources from an integrated circuit, a memory, an interface, and/or the like.

In some implementations, network device 220 may identify a configuration of resources by executing a scanning technique that is able to scan one or more components of network device 220. For example, network device 220 may execute a scanning technique that is able to scan one or more power components 365 to determine the power supply configuration for network device 220, and that is able to scan one or more components of each line card 320 to determine the resource distribution configuration for each line card 320.

In some implementations, network device 220 may identify a configuration of resources by executing a scanning technique that is able to scan one or more data structures. For example, network device 220 may execute a scanning technique that is able to scan one or more data structures that store data identifying the power supply configuration and/or the resource distribution configuration for the one or more line cards 320.

As an example, network device 220 may identify a configuration of resources wherein a group of packet processing components 322 in a line card 320 share resources and rely on a single power supply and power supply switch. As another example, network device 220 may identify a configuration of resources wherein a group of packet processing components 322 in a line card 320 share resources and rely on multiple power supplies and power supply switches.

As another example, network device 220 may identify a configuration of resources wherein a group of packet processing components 322 in a line card 320 do not share resources and rely on a single power supply and power supply switch. As another example, network device 220 may identify a configuration of resources wherein a group of packet processing components 322 in a line cards do not share resources and rely on multiple power supplies and power supply switches.

In this way, network device 220 is able to identify a configuration of resources that may be subsequently used for selectively modifying a power state of a packet processing component 322, as described further herein.

As further shown in FIG. 4, process 400 may include powering on one or more packet processing components, of a group of packet processing components, to allow the one or more packet processing components to receive and process traffic (block 420). For example, network device 220 (e.g., controller 350) may power on a particular packet processing component 322 based on instructions received from another device, as described below.

In some implementations, network device 220 may power on a particular packet processing component 322. For example, network device 220 may power on the particular packet processing component 322 by enabling power to the particular packet processing component 322 to allow the particular packet processing component 322 to execute a boot-up procedure. In this case, network device 220 may provide an instruction to a power supply switch to cause the power supply switch to open a flow of current from a power supply to the particular packet processing component 322, thereby enabling the particular packet processing component 322 to execute the boot-up procedure. The boot-up procedure may include powering on any elements within the particular packet processing component 322 that are used to carry out the packet routing and/or packet processing functions.

In some implementations, network device 220 may power on the particular packet processing component 322 based on receiving instructions from another device. For example, if a client purchases a new line card 320, the client may plug the new line card 320 into a chassis of network device 220. To enable the particular packet processing component 322 of line card 320 to receive and process traffic, the client may need to interact with an interface of a client device to request that the particular packet processing component 322 be activated. In this case, the client device may provide the request to a server device operated by an organization that manages network device 220, which may cause the server device to activate the particular packet processing component 322 (e.g., by interacting with network device 220 using an application programming interface (API)).

In some cases, network device 220 may power on the particular packet processing component 322 without powering on any other packet processing components 322. For example, if the particular packet processing component 322 does not share power resources, then network device 220 may power on the particular packet processing component 322 without powering on any other packet processing components 322.

In other cases, network device 220 may power on multiple packet processing components 322. For example, if the particular packet processing component 322 shares power resources with at least one other packet processing component 322, then network device 220 may need to power on multiple packet processing components 322 (e.g., because enabling power to flow to the particular packet processing component 322 may also enable power to flow to other packet processing components 322 that share the same power resources).

In this way, network device 220 is able to power on one or more packet processing components 322.

As further shown in FIG. 4, process 400 may include determining whether to modify a power state of a packet processing component, of the group of packet processing components (block 430). For example, network device 220 (e.g., controller 350) may determine whether to modify a power state of packet processing component 322, of the group of packet processing components 3220, based on determining whether a power modification condition is satisfied.

A power state may refer to an amount of power that is presently available to a packet processing component 322. A packet processing component 322 may be in a full power state, a low power state, or a no power state. The power modification condition may be satisfied if network device 220 receives instructions (e.g., from another device) to modify the power state, if a capacity level of a packet processing component 322 satisfies a threshold capacity level, if an error (e.g., a hardware error, a software error, etc.) associated with the packet processing component 322 is detected, if an output from a machine learning model predicts a negative consequence that may require modifying the power state, and/or the like.

In some implementations, network device 220 may determine whether to modify a power state of a particular packet processing component 322 based on instructions received from another device. For example, network device 220 may be configured with a power modification condition indicating that network device 220 is to modify a power state if network device 220 receives instructions, from another device, indicating to modify a power state. As an example, if network device 220 is already being used to process traffic, network device 220 may modify a power state of the packet processing component 322 based on a request to change a number of active packet processing components 322.

As a particular example, assume network device 220 is processing traffic using two packet processing components 322 of four available packet processing components 322 included in a line card 320. Further assume that a client using network device 220 grows the client's business such that an additional packet processing component 322 needs to be activated to process additional incoming traffic. In this case, network device 220 may modify the power state of one of the two remaining packet processing components 322 from a no power state or from a low power state to a full power state.

Additionally, or alternatively, network device 220 may determine whether to modify a power state of a particular packet processing component 322 based on a capacity level. For example, network device 220 may monitor capacity levels for one or more additional packet processing components 322 that are powered on and receiving and processing traffic. In this case, network device 220 may determine that a capacity level of one of the additional packet processing components 322 satisfies a threshold capacity level, which may cause network device 220 to determine to modify the power state of the particular packet processing component 322 from a no power state or from a low power state to a full power state (e.g., to help reduce an amount of traffic that the other packet processing components 322 have to receive and process).

Additionally, or alternatively, network device 220 may determine whether to modify a power state of a particular packet processing component 322 based on detecting an error. For example, network device 220 may monitor one or more hardware components of network device 220 and/or one or more elements (i.e., software features) of network device 220, while the particular packet processing component 322 is receiving and/or processing traffic. In this case, network device 220 may detect an error, based on the monitoring, and may determine to modify a power state of the particular packet processing component 322 based on detecting the error.

As an example, if an error is detected on the particular packet processing component 322, then network device 220 may determine to modify a power state from a full power state to a no power state or to a low power state. As another example, if an error is detected on a different packet processing component 322, then network device 220 may determine to modify a power state of the particular packet processing component 322 from a no power state or from a low power state to a full power state (e.g., to receive and/or process traffic of the packet processing component 322 that incurred the error).

Additionally, or alternatively, network device 220 may determine whether to modify a power state of a particular packet processing component 322 based on an output of a machine learning model. For example, network device 220 may train a machine learning model on historical data to identify time periods at which errors are likely to occur (e.g., hardware component errors, software element errors, etc.). The historical data may identify trends of when certain types of errors are likely to occur, when hardware components are likely to age, and/or the like. In this case, network device 220 may provide, as input to the machine learning model, the identified configuration of resources and additional network device information (e.g., indicating an age of the hardware equipment, a type of hardware equipment, a type of element used, etc.) to cause the machine learning model to output a projected time period at which an error is likely to occur. In this case, network device 220 may determine to modify a power state prior to the projected time period at which the error is likely to occur.

As another example, network device 220 may train a machine learning model on historical client data to identify time periods at which increases in traffic are likely to occur. The historical client data may be used to identify forecasts of growth in sales by the client, forecasted increases in traffic, forecasted decreases in traffic, and/or the like. In this example, network device 220 may provide, as input to the machine learning model, client data to cause the machine learning model to output a projected time period at which increases or decreases in traffic are likely to occur. In this case, network device 220 may determine to modify a power state prior to the projected time period at which the increases or decreases in traffic are likely to occur.

In this way, network device 220 is able to determine whether to modify a power state of a packet processing component 322 based on whether a power modification condition is satisfied.

As further shown in FIG. 4, process 400 may include modifying a power state of the packet processing component, of the group of packet processing components, based on determining that the power modification condition is satisfied (block 440). For example, network device 220 (e.g., controller 350) may modify a power state of the packet processing component 322 based on determining that the power modification condition is satisfied. Additionally, in some cases, network device 220 may selectively modify a power state of the packet processing component 322, such as by selecting whether to modify a power state from a full power state to an off state or to a low power state, as described further herein.

In some implementations, network device 220 may modify a power state of the particular packet processing component 322. For example, network device 220 may modify a power state from a full power state to a no power state by instructing the packet processing component 322 to perform a shutdown procedure, and by cutting power to the packet processing component 322. Additionally, network device 220 may modify a power state from a no power state to a full power state, in a manner described above (see, e.g., block 420). Additionally, network device 220 may modify a power state from a full power state to a low power state by performing a reset procedure that enables the packet processing component 322 to restart and boot up in a low power state.

In some implementations, network device 220 may selectively modify the power state of the particular packet processing component 322. For example, network device 220 may selectively modify the full power state from a no power state or to a low power state based on the identified configuration of resources of network device 220 (e.g., as identified in block 410).

As an example, assume that network device 220 includes a line card 320 that does not share resources between packet processing components 322, and that network device 220 is configured such that each packet processing component 322 is able to utilize separate power supplies and power supply switches. In this case, if network device 220 determines that the power state of a packet processing component 322 needs to be modified, network device 220 may modify the power state to a no power state, without needing to utilize the low power state. This is because each packet processing component 322 has separate resources and separate power supplies, thereby allowing a particular packet processing component 322 to be turned completely off without the power off influencing the remaining packet processing components 322.

As another example, assume network device 220 includes a line card 320 that does not share resources between packet processing components 322, and that network device 220 is configured such that each packet processing component 322 shares the same power supply and power supply switch. In this case, if network device 220 detects that the power state of a packet processing component 322 needs to be modified, network device 220 may modify the power state from a full power state to a low power state (and not to a no power state). This is because each packet processing component 322 shares power resources, and turning off a particular packet processing component 322 may result in the remaining packet processing components 322 losing power.

As another example, assume network device 220 includes a line card 320 that shares resources between packet processing components 322, and that network device 220 is configured such that each packet processing component 322 shares the same power supply and power supply switch. In this case, if network device 220 detects that the power state of a packet processing component 322 needs to be modified, network device 220 may modify the power state to a low power state (and not to a no power state). This is because each packet processing component 322 shares internal resources and power resource, and turning off a particular packet processing component 322 may result in the remaining packet processing components 322 losing power.

As another example, assume network device 220 includes a line card 320 that shares resources with packet processing components 322, and that network device 220 is configured such that each packet processing component 322 is able to utilize separate power supplies and power supply switches. In this case, if network device 220 detects that the power state of a packet processing component 322 needs to be modified, network device 220 may modify the power state to a low power state. This is because each packet processing component 322 shares internal resources, and turning off a particular packet processing component 322 may result in the remaining packet processing components 322 losing power.

As another example, assume network device 220 includes a line card 320 that shares resources with some of the packet processing components 322, while other packet processing components 322 have separate resources, that the packet processing components 322 that share resources also share power resources, and that the other packet processing components 322 each have individual power resources. In this case, if network device 220 detects that the power state of a packet processing component 322 needs to be modified, network device 220 may modify the power state to either a no power state or to a low power state, depending on whether a particular packet processing component 322 has neither shared resources nor shared power resources.

If the particular packet processing component 322 has neither shared resources nor shared power resources, network device 220 may modify the power state from a full power state to a no power state based on one of the above-mentioned triggers. If the particular packet processing component 322 has shared resources and/or shared power resources, network device 220 may modify the power state from a full power state to a low power state based on one of the above-mentioned triggers.

In this way, network device 220 is able to modify a power state of one or more packet processing components 322.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, network device 220 is able to modify the power state of packet processing component 322 regardless of the power supply configuration of network device 220 or the resource distribution configuration of line cards 320 within network device 220. Furthermore, by selectively powering on particular packet processing components 322, and by keeping certain packet processing components 322 in the low power state, network device 220 conserves power resources relative to a conventional network device that has to power on all packet processing components 322 and/or that is unable to utilize the low power state.

Additionally, by allowing network device 220 to power off particular packet processing components 322, without having to power off other packet processing components 322 (e.g., that share resources with the particular packet processing component 322), network device 220 conserves processing resources that might otherwise be used to retransmit traffic lost while powering off all packet processing components 322, conserves processing resources that might otherwise be used to execute error correction techniques after traffic is lost, and/or the like. Moreover, by allowing network device 220 to keep particular packet processing components 322 in the no power state or in the low power state, network device 220 reduces overall power consumption of network device 220, reduces expenses of clients of network device 220 (e.g., if the client is on a pay-as-you-go plan, etc.), and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

As used herein, the term group is to be refer to one or more of something. For example, a group of components may refer to one or more components, a group of one or more elements may refer to one or more elements, and/or the like. As an example, a group of packet processing components may refer to one or more packet processing components.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more line cards,
wherein the one or more line cards support one or more groups of packet processing components; and
one or more processors to:
execute a scanning technique to identify a configuration of resources that are to support the one or more groups of packet processing components,
wherein the configuration includes:
a power supply configuration that is used to provide power to the one or more groups of packet processing components, and
a resource distribution configuration indicating whether resources in the one or more line cards are shared between packet processing components included in the one or more groups of packet processing components;
train, before identifying the configuration of resources that are to support the one or more groups of packet processing components, a machine learning model to identify time periods at which errors on hardware components are likely to occur,
wherein the machine learning model has been trained on historical data that identifies trends of when certain types of hardware equipment are to age to a point of causing errors;
provide hardware information for the network device as input to the machine learning model to cause the machine learning model to output information identifying a projected time period at which an error on a hardware component of the packet processing component is likely to occur;

determine whether to modify a power state of a packet processing component, of the one or more groups of packet processing components, based on whether a power modification condition is satisfied,
  wherein the power state of the packet processing component is determined to be modified prior to the projected time period; and
modify the power state of the packet processing component based on determining that the power modification condition is satisfied,
  wherein the power state is capable of being modified to:
    a full power state,
    a low power state, or
    a no power state,
  wherein the power state of the packet processing component is able to be modified to a particular power state based on the configuration of resources that is to support the one or more groups of packet processing components, and
  wherein the power state of the packet processing component is modified to the no power state or to the low power state prior to the projected time period.

2. The network device of claim 1, wherein the one or more processors, when modifying the power state of the packet processing component, are to:
  modify the power state of the packet processing component without modifying power states of other packet processing components of the one or more groups of packet processing components,
    wherein the power state is modified from the full power state to:
      the low power state, or
      the no power state.

3. The network device of claim 1, wherein the one or more processors, when determining whether to modify the power state of the packet processing component, are to:
  receive an instruction to power on the packet processing component,
  determine to modify the power state of the packet processing component based on receiving the instruction; and
  wherein the one or more processors, when modifying the power state of the packet processing component, are to:
    modify the power state of the packet processing component from the no power state to the full power state, and
    modify power states for any other packet processing components, of the one or more groups of packet processing components, that share power resources or line card resources with the packet processing component,
      wherein modifying the power state for any other packet processing components includes modifying the power state from the no power state to the full power state, and subsequently modifying the power state from the full power state to the low power state.

4. The network device of claim 1, wherein the one or more processors, when determining whether to modify the power state of the packet processing component, are to:
  monitor capacity levels for one or more additional packet processing components, of the one or more groups of packet processing components, that are powered on and receiving traffic,
    wherein the packet processing component, of the one or more groups of packet processing components, is in the no power state or the low power state and is not receiving traffic,
  determine that a capacity level for a particular packet processing component, of the one or more additional packet processing components, satisfies a threshold capacity level, and
  determine to modify the power state of the packet processing component based on determining that the capacity level for the particular packet processing component satisfies the threshold capacity level; and
  wherein the one or more processors, when modifying the power state of the packet processing component, are to:
    modify the power state to the full power state to enable the packet processing component to receive traffic and to reduce the capacity level of the particular packet processing component.

5. The network device of claim 1, wherein the one or more processors, when determining whether to modify the power state of the packet processing component, are to:
  monitor one or more hardware components of the packet processing component while the packet processing component is powered on and receiving traffic,
  detect an error on a hardware component, of the one or more hardware components, based on monitoring the one or more hardware components, and
  determine to modify the power state of the packet processing component based on detecting the error on the hardware component; and
  wherein the one or more processors, when modifying the power state of the packet processing component, are to:
    modify the power state to the no power state or to the low power state based on the power supply configuration and the resource distribution configuration for a line card used to support the one or more groups of packet processing components,
      wherein the line card is one of the one or more line cards.

6. The network device of claim 1, wherein the one or more processors, when providing the hardware information for the network device as input to the machine learning model, are further to provide one or more of:
  information associated with an age of the hardware equipment as input to the machine learning model, or
  information associated with a type of hardware equipment as input to the machine learning model.

7. The network device of claim 1, wherein the one or more processors, when modifying the power state of the packet processing component, are to:
  modify the power state from the full power state to the low power state based on identifying that the packet processing component:
    shares line card resources with at least one other packet processing component in the one or more groups of packet processing components, or
    shares power resources with at least one other packet processing component in the one or more groups of packet processing components, or
  modify the power state from the full power state to the no power state based on identifying that the packet processing component does not share line card resources with the at least one other packet processing component and based on identifying that the packet processing component does not share power resources with the at least one other packet processing component.

8. A non-transitory computer-readable medium storing instructions, the instructions comprising:
one or more instructions that, when executed by one or more processors, cause the one or more processors to:
execute a scanning technique to identify a configuration of resources that are to support one or more line cards that are attachable to a device associated with the one or more processors,
wherein the configuration includes at least one of:
a power supply configuration that is used to provide power to one or more groups of packet processing components that are supported by the one or more line cards, or
a resource distribution configuration indicating whether resources in the one or more line cards are shared between packet processing components included in the one or more groups of packet processing components;
train, before identifying the configuration of resources that are to support the one or more groups of packet processing components, a machine learning model to identify time periods at which errors on hardware components are likely to occur,
wherein the machine learning model has been trained on historical data that identifies trends of when certain types of hardware equipment are to age to a point of causing errors;
provide hardware information for the device as input to the machine learning model to cause the machine learning model to output information identifying a projected time period at which an error on a hardware component of the packet processing component is likely to occur;
determine whether to modify a power state of a packet processing component, of the one or more groups of packet processing components, based on whether a power modification condition is satisfied
wherein the power state of the packet processing component is determined to be modified prior to the projected time period; and
modify the power state of the packet processing component based on determining that the power modification condition is satisfied,
wherein the power state is capable of being modified from a first power state to:
a second power state, or
a third power state,
wherein the power state of the packet processing component is able to be modified to the second power state or to the third power state based on the configuration of resources that support the one or more line cards, and
wherein the power state of the packet processing component is modified to the third power state or to the second power state prior to the projected time period.

9. The non-transitory computer-readable medium of claim 8, wherein the one or more instructions, that cause the one or more processors to modify the power state, cause the one or more processors to:
modify the power state of the packet processing component from the first power state to the second power state or to the third power state,
wherein the first power state is a full power state, the second power state is a low power state, and the third power state is a no power state, and
wherein the power state is able to be modified without modifying power states of other packet processing components of the one or more groups of packet processing components.

10. The non-transitory computer-readable medium of claim 8, wherein the one or more instructions, that cause the one or more processors to execute the scanning technique to identify the configuration of resources, cause the one or more processors to:
execute the scanning technique to identify the configuration of resources,
wherein the scanning technique identifies a number of power supplies that are used to support the one or more groups of packet processing components, and
wherein the scanning technique identifies, for a line card of the one or more line cards, whether packet processing components that are supported by the line card share line card resources or have dedicated line card resources.

11. The non-transitory computer-readable medium of claim 8, wherein the one or more instructions, that cause the one or more processor to determine whether to modify the power state of the packet processing component, cause the one or more processors to:
monitor one or more elements of the packet processing component while the packet processing component is powered on and receiving traffic,
detect an error associated with an element, of the one or more elements, based on monitoring the one or more elements, and
determine to modify the power state of the packet processing component based on detecting the error associated with the element; and
wherein the one or more instructions, that cause the one or more processors to modify the power state of the packet processing component, cause the one or more processors to:
modify the power state from the first power state to the second power state or to the third power state based on the power supply configuration and the resource distribution configuration for a line card used to support the packet processing component.

12. The non-transitory computer-readable medium of claim 8, wherein the one or more instructions, when executed by the one or more processors, further cause the one or more processors to:
provide client data as input to the machine learning model to cause the machine learning model to output information identifying the projected time period at which an increase in traffic is likely to occur; and
wherein the one or more instructions, that cause the one or more processors to modify the power state of the packet processing component, cause the one or more processors to:
modify the power state of the packet processing component from the first power state to the second power state or to the third power state prior to the project time period,
wherein the first power state is a full power state, the second power state is a low power state, and the third power state is a no power state.

13. The non-transitory computer-readable medium of claim 8, wherein the one or more instructions, that cause the one or more processor to determine whether to modify the power state, cause the one or more processors to:

monitor capacity levels for one or more additional packet processing components, of the one or more groups of packet processing components, that are powered on and receiving traffic,
  wherein the packet processing component is in the first power state or the second power state and is not receiving traffic, and
  wherein the first power state is a no power state and the second power state is a low power state,
determine that a capacity level for a particular packet processing component, of the one or more additional packet processing components, satisfies a threshold capacity level, and
determine to modify the power state of the packet processing component based on determining that the capacity level for the particular packet processing component satisfies the threshold capacity level; and
wherein the one or more instructions, that cause the one or more processors to modify the power state of the packet processing component, cause the one or more processors to:
  modify the power state to the third power state to enable the packet processing component to receive traffic and to reduce the capacity level of the particular packet processing component,
  wherein the third power state is a full power state.

14. The non-transitory computer-readable medium of claim 8, wherein the one or more instructions, that cause the one or more processors to modify the power state of the packet processing component, cause the one or more processors to:
  modify the power state from the first power state to the second power state based on identifying that the packet processing component:
    shares a line card resource with at least one other packet processing component of the one or more groups of packet processing components, and/or
    shares a power resource with at least one other packet processing component of the one or more groups of packet processing components,
  wherein the first power state is a full power state and the second power state is a low power state, or
  modify the power state from the first power state to the third power state based on identifying that the packet processing component does not share a line card resource with the at least one other packet processing component and based on identifying that the packet processing component does not share a power resource with the at least one other packet processing component,
  wherein the third power state is a no power state.

15. A method, comprising:
identifying, by a network device, a configuration of resources that are to support one or more line cards that are attachable to the network device,
  wherein the configuration includes:
    a power supply configuration that is used to provide power to one or more groups of packet processing components that are supported by the one or more line cards, and
    a resource distribution configuration indicating whether resources in the one or more line cards are shared between packet processing components included in the one or more groups of packet processing components;
training, by the network device and before identifying the configuration of resources that are to support the one or more groups of packet processing components, a machine learning model to identify time periods at which errors on hardware components are likely to occur,
  wherein the machine learning model has been trained on historical data that identifies trends of when certain types of hardware equipment are to age to a point of causing errors;
providing, by the network device, hardware information for the network device as input to the machine learning model to cause the machine learning model to output information identifying a projected time period at which an error on a hardware component of the packet processing component is likely to occur;
determining, by the network device, whether to modify a power state of a packet processing component, of the one or more groups of packet processing components, based on whether one or more power modification conditions are satisfied,
  wherein the power state of the packet processing component is determined to be modified prior to the projected time period; and
modifying, by the network device, the power state of the packet processing component based on determining that the power modification condition is satisfied,
  wherein the power state of the packet processing component is able to be modified to a particular power state based on the configuration of resources supporting the one or more groups of packet processing components, and
  wherein the power state of the packet processing component is modified to the particular power state prior to the projected time period.

16. The method of claim 15, wherein the power state of the packet processing component is able to be modified without modifying power states of other packet processing components of the one or more groups of packet processing components.

17. The method of claim 15, wherein modifying the power state of the packet processing component comprises:
selectively modifying the power state of the packet processing component from a full power state to a low power state or from the full power state to a no power state based on the identified configuration of resources.

18. The method of claim 15, wherein identifying the configuration of resources comprises:
executing a scanning technique to identify the configuration of resources,
  wherein executing the scanning technique causes one or more processors of the network device to identify the configuration of resources by analyzing one or more data structures that store the power supply configuration and the resource distribution configuration.

19. The method of claim 15, wherein determining whether to modify the power state of the packet processing component comprises:
determining that a capacity level for another packet processing component, of the one or more groups of packet processing components, satisfies a threshold capacity level,
  wherein the packet processing component, of the one or more groups of packet processing components, is in a no power state and is not receiving traffic, and
determining to modify the power state of the packet processing component based on determining that the capacity level for the other packet processing component satisfies the threshold capacity level; and wherein modifying the power state of the packet processing component comprises:

modifying the power state from the no power state to a full power state to enable the packet processing component to receive traffic and to reduce the capacity level of the other packet processing component.

20. The method of claim 15, further comprising:

providing the identified configuration of resources and additional network device information as input to the machine learning model to cause the machine learning model to output information identifying the projected time period at which an error is likely to occur; and wherein modifying the power state of the packet processing component comprises:

modifying the power state of the packet processing component from an on state to a no power state or to a low power state prior to the projected time period.

* * * * *